(12) United States Patent
Jiang et al.

(10) Patent No.: US 10,918,940 B2
(45) Date of Patent: Feb. 16, 2021

(54) METHOD AND DEVICE FOR DOWNLOADING AND RECONSTRUCTING GAME DATA

(71) Applicant: Jingcai Online Technology (Dalian) Co., Ltd., Dalian (CN)

(72) Inventors: Changsong Jiang, Dalian (CN); Jianbin Fang, Dalian (CN); Jiqing Zhang, Dalian (CN); Ming Yang, Dalian (CN)

(73) Assignee: JINGCAI ONLINE TECHNOLOGY (DALIAN) CO., LTD., Dalian (CN)

(*) Notice: Subject to any disclaimer, the term of this patent is extended or adjusted under 35 U.S.C. 154(b) by 935 days.

(21) Appl. No.: 15/231,940

(22) Filed: Aug. 9, 2016

(65) Prior Publication Data

US 2017/0056767 A1  Mar. 2, 2017

(30) Foreign Application Priority Data

Aug. 24, 2015  (CN) .......................... 2015 1 0528057

(51) Int. Cl.
*A63F 13/358* (2014.01)
*A63F 13/355* (2014.01)
*G06T 15/50* (2011.01)

(52) U.S. Cl.
CPC .......... *A63F 13/358* (2014.09); *A63F 13/355* (2014.09); *G06T 15/506* (2013.01); *G06T 2200/16* (2013.01); *G06T 2210/08* (2013.01)

(58) Field of Classification Search
CPC ... A63F 13/52; A63F 13/60; A63F 2300/6018
See application file for complete search history.

(56) References Cited

U.S. PATENT DOCUMENTS 4,645,459 A * 2/1987 Graf ........................ G06T 15/04
                                                        345/426
5,696,892 A * 12/1997 Redmann ................ G06T 13/20
                                                        345/473

(Continued)

*Primary Examiner* — Steven J Hylinski
(74) *Attorney, Agent, or Firm* — Norton Rose Fulbright US LLP (57) ABSTRACT

Embodiments of the present application disclose a method and device for downloading and reconstructing game data, and relate to the technical field of Internet. Wherein, the method for downloading game data comprises: sending to a first destination end a data downloading instruction for a game scene to be downloaded; receiving an identifier of a scene template of the game scene to be downloaded, an identifier of a scene object in the game scene to be downloaded and location information of the scene object in the game scene to be downloaded that are fed back by the first destination end, wherein, the location information of the scene object in the game scene to be downloaded is used in combination with illumination parameters of a game engine itself to determine illumination effect of the scene object in the game scene to be downloaded, and the identifier of the scene object in the game scene to be downloaded is used in combination with the location information of the scene object in the game scene to be downloaded and a preset scene object display effect database to determine display effect of the scene object in the game scene to be downloaded. The solutions provided by the embodiments of the present application can be applied to reduce the amount of data during downloading game scene data.

20 Claims, 3 Drawing Sheets

(56) References Cited

U.S. PATENT DOCUMENTS

| | | | | |
|---|---|---|---|---|
| 10,279,259 | B2* | 5/2019 | Jiang | A63F 13/355 |
| 2002/0082081 | A1* | 6/2002 | Takeuchi | H04N 13/122 |
| | | | | 463/32 |
| 2005/0275717 | A1* | 12/2005 | Camus | H04N 13/275 |
| | | | | 348/42 |
| 2006/0256130 | A1* | 11/2006 | Gonzalez | G06F 16/958 |
| | | | | 345/619 |
| 2007/0060233 | A1* | 3/2007 | Liccardo | A63F 13/10 |
| | | | | 463/8 |
| 2007/0198710 | A1* | 8/2007 | Gopalakrishnan | H04L 67/06 |
| | | | | 709/225 |
| 2007/0256018 | A1* | 11/2007 | Chatani | G06Q 30/00 |
| | | | | 715/733 |
| 2008/0192058 | A1* | 8/2008 | Liu | A63F 13/12 |
| | | | | 345/473 |
| 2009/0253517 | A1* | 10/2009 | Bererton | A63F 13/12 |
| | | | | 463/42 |
| 2011/0281628 | A1* | 11/2011 | Sieka | G07F 17/3211 |
| | | | | 463/16 |
| 2014/0235347 | A1* | 8/2014 | Zhang | A63F 13/00 |
| | | | | 463/35 |
| 2015/0032766 | A1* | 1/2015 | Greenbaum | G06F 16/444 |
| | | | | 707/756 |
| 2016/0361658 | A1* | 12/2016 | Osman | A63F 13/86 |

\* cited by examiner

METHOD AND DEVICE FOR DOWNLOADING AND RECONSTRUCTING GAME DATA

CROSS-REFERENCE TO RELATED APPLICATIONS

This application claims priority to Chinese Application No. 201510528057.3, filed Aug. 24, 2015, and entitled "METHOD AND DEVICE FOR DOWNLOADING AND RECONSTRUCTING GAME DATA", which is incorporated herein by reference.

TECHNICAL FIELD

The present application relates to the technical field of Internet, and in particular to a method and a device for downloading and reconstructing game data.

BACKGROUND

With the improved performances of terminals used by users, games have increasingly entered the lives of people. Among these games, some are games with a network function and some are games without a network function. Wherein, when a user is playing a game with a network function, he/she often shares his/her game scene information to other users, for example, a user shares a map made by himself/herself to other users in a battle game, and a user shares a room arranged by himself/herself to other users in a pretending game etc.

In the prior art, when generating a game scene, it is often required to determine background information of the scene, scene objects in the scene, location of each scene object, illumination effects and display effects and the like, wherein, illumination effect and display effect and the like of each scene object are all generated by adjusting the scene objects according to the background information of the scene by users. Thus, it is necessary to send all the information such as the illumination effect and display effect of each scene object, to other users when sharing game scenes to other users. In view of the above, when a client needs to download game scene data, it is required to download all the data of the game scene generated by the method described above, so as to ensure that the downloaded game scene can be reconstructed in the client. However, the amount of data such as illumination effects, display effects of scene objects is relatively large, which cause that a client needs to download a large amount of data of a game scene and it takes a long time that for a client to download a game scene, thereby affecting the user experience.

SUMMARY

Embodiments of the present application disclose a method and a device for downloading and reconstructing game data, so as to decrease the amount of data when downloading game scene data, data downloading time and to improve the user experience.

To achieve the above objectives, embodiments of the present application disclose a method for downloading game data, which comprises:

sending to a first destination end a data downloading instruction for a game scene to be downloaded; and receiving an identifier of a scene template of the game scene to be downloaded, an identifier of a scene object in the game scene to be downloaded and location information of the scene object in the game scene to be downloaded that are fed back by the first destination end, wherein, the location information of the scene object in the game scene to be downloaded is used in combination with illumination parameters of a game engine itself to determine illumination effect of the scene object in the game scene to be downloaded, and the identifier of the scene object in the game scene to be downloaded is used in combination with the location information of the scene object in the game scene to be downloaded and a preset scene object display effect database to determine display effect of the scene object in the game scene to be downloaded.

In a specific implementation of the present application, after receiving an identifier of a scene template of the game scene to be downloaded, an identifier of a scene object in the game scene to be downloaded and location information of the scene object in the game scene to be downloaded that are fed back by the first destination end, the method further comprises:

obtaining the scene template of the game scene to be downloaded from a preset scene template database according to the identifier of the scene template of the game scene to be downloaded;

obtaining the scene object in the game scene to be downloaded from a preset scene object database according to the identifier of the scene object in the game scene to be downloaded;

determining illumination effect of the scene object in the game scene to be downloaded according to the location information of the scene object in the game scene to be downloaded and illumination parameters of the game engine itself;

determining display effect of the scene object in the game scene to be downloaded according to the scene object in the game scene to be downloaded, the location information of the scene object in the game scene to be downloaded and the preset scene object display effect database; and displaying, in the scene template of the game scene to be downloaded, the scene object in the game scene to be downloaded in a manner of the determined display effect of the scene object and rendering the scene object in the game scene to be downloaded in a manner of the determined illumination effect of the scene object, according to the location of the scene object in the game scene to be downloaded.

In a specific implementation of the present application, the method for downloading game data further comprises:

obtaining a target game scene;

obtaining data to be uploaded of the target game scene in the case that a preset condition for uploading data is satisfied, wherein, the data to be uploaded at least comprises: an identifier of a scene template of the target game scene, an identifier of a scene object in the target game scene and location information of the scene object in the target game scene, the location information of the scene object in the target game scene is used in combination with illumination parameters of a game engine itself to determine illumination effect of the scene object in the target game scene, the identifier of the scene object in the target game scene is used in combination with the location information of the scene object in the target game scene and the preset scene object display effect database to determine display effect of the scene object in the target game scene; and sending to a second destination end the data to be uploaded so as to complete uploading data for the target game scene.

In a specific implementation of the present application, the step of obtaining data to be uploaded of the target game scene in the case that a preset condition for uploading data is satisfied comprises:

verifying whether the target game scene satisfies a preset verification condition corresponding to a current game mode; and if yes, obtaining the data to be uploaded of the target game scene.

In a specific implementation of the present application, the step of obtaining a target game scene further comprises:

obtaining the scene template of the target game scene from the preset scene template database according to an identifier of a user-selected scene template;

obtaining the scene object in the target game scene from the preset scene object database according to an identifier of a user-selected scene object;

determining the location of the scene object in the target game scene according to an edition instruction or a saving instruction for the scene object in the target game scene;

obtaining display effect of the scene object in the target game scene from a preset scene object display effect database according to the scene object in the target game scene and the location of the scene object in the target game scene, and displaying, in the scene template of the target game scene, the scene object in the target game scene in a manner of the obtained display effect according to the determined location of the scene object; and determining illumination effect of the scene object in the target game scene according to the determined location of the scene object and illumination parameters of a game engine itself, and rendering the scene object in the target game scene in a manner of the determined illumination effect and thus obtaining the target game scene.

In a specific implementation of the present application, the method for downloading game data further comprises:

generating scene data of the target game scene according to the target game scene, wherein, the scene data of the target game scene at least comprises: an identifier of a scene template of the target game scene, an identifier of a scene object in the target game scene and location information of the scene object in the target game scene; and storing the scene data.

In a specific implementation of the present application, the step of obtaining a scene object of the target game scene from a preset scene object database according to an identifier of a user-selected scene object comprises:

determining identifiers of user-selectable scene objects according to user attribute information of a user; and obtaining the scene object in the target game scene from the preset scene object database according to an identifier of a scene object selected by the user from the identifiers of the user-selectable scene objects.

To achieve the above objectives, embodiments of the present application disclose a method for reconstructing game data, which comprises:

obtaining an identifier of a scene template of a target game scene, an identifier of a scene object in the target game scene and location information of the scene object in the target game scene;

obtaining the scene template of the target game scene from a preset scene template database according to the identifier of the scene template of the target game scene;

obtaining the scene object in the target game scene from a preset scene object database according to the identifier of the scene object in the target game scene;

obtaining display effect of the scene object in the target game scene from a preset scene object display effect database according to the scene object in the target game scene and the location information of the scene object in the target game scene, and displaying, in the scene template of the target game scene, the scene object in the target game scene in a manner of the obtained display effect according to the location information of the target scene object; and determining illumination effect of the scene object in the target game scene according to the location information of the scene object in the target game scene and illumination parameters of a game engine itself, and rendering the scene object in the target game scene in a manner of the determined illumination effect, and thus completing the reconstruction of the target game scene.

In a specific implementation of the present application, the method for reconstructing game data further comprises:

performing an edition operation for the target game scene after the reconstruction of the target game scene is completed; and updating scene data of the target game scene according to the edition operation, wherein, the scene data at least comprises: the identifier of the scene template of the target game scene, the identifier of the scene object in the target game scene and the location information of the scene object in the target game scene.

In a specific implementation of the present application, the method for reconstructing game data further comprises:

detecting whether current remaining storage space is larger than a preset threshold;

if yes, storing all data of the target game scene after the reconstruction.

To achieve the above objectives, embodiments of the present application disclose a device for downloading game data, which comprises:

a downloading instruction sending module, for sending to a first destination end a data downloading instruction for a game scene to be downloaded;

a feedback information receiving module for receiving an identifier of a scene template of the game scene to be downloaded, an identifier of a scene object in the game scene to be downloaded and location information of the scene object in the game scene to be downloaded that are fed back by the first destination end, wherein, the location information of the scene object in the game scene to be downloaded is used in combination with illumination parameters of a game engine itself to determine illumination effect of the scene object in the game scene to be downloaded, and the identifier of the scene object in the game scene to be downloaded is used in combination with the location information of the scene object in the game scene to be downloaded and a preset scene object display effect database to determine display effect of the scene object in the game scene to be downloaded.

In a specific implementation of the present application, the device for downloading game data further comprises:

a first scene template obtaining module for obtaining the scene template of the game scene to be downloaded from a preset scene template database according to the identifier of the scene template of the game scene to be downloaded after the feedback information is received by the feedback information receiving module;

a first scene object obtaining module for obtaining the scene object in the game scene to be downloaded from a preset scene object database according to the identifier of the scene object in the game scene to be downloaded;

an illumination effect determining module for determining illumination effect of the scene object in the game scene to be downloaded according to the location information of the scene object in the game scene to be downloaded and illumination parameters of the game engine itself;

a display effect determining module for determining display effect of the scene object in the game scene to be downloaded according to the scene object in the game scene to be downloaded, the location information of the scene object in the game scene to be downloaded and the preset scene object display effect database; and a first scene object rendering module for displaying, in the scene template of the game scene to be downloaded, the scene object in the game scene to be downloaded in a manner of the determined display effect of the scene object and rendering the scene object in the game scene to be downloaded in a manner of the determined illumination effect of the scene object, according to the location of the scene object in the game scene to be downloaded.

In a specific implementation of the present application, the device for downloading game data further comprises:

a game scene obtaining module for obtaining a target game scene;

an uploaded data obtaining module for obtaining data to be uploaded of the target game scene in the case that a preset condition for uploading data is satisfied, wherein, the data to be uploaded at least comprises: an identifier of a scene template of the target game scene, an identifier of a scene object in the target game scene and location information of the scene object in the target game scene, the location information of the scene object in the target game scene is used in combination with illumination parameters of a game engine itself to determine illumination effect of the scene object in the target game scene, the identifier of the scene object in the target game scene is used in combination with the location information of the scene object in the target game scene and the preset scene object display effect database to determine display effect of the scene object in the target game scene; and an uploaded data sending module for sending to a second destination end the data to be uploaded, so as to complete uploading data for the target game scene.

In a specific implementation of the present application, the uploaded data obtaining module comprises:

a game scene verifying sub-module for verifying whether the target game scene satisfies a preset verification condition corresponding to a current game mode; and an uploaded data obtaining sub-module for obtaining the data to be uploaded of the target game scene in the case that the verification result from the game scene verifying sub-module is true.

In a specific implementation of the present application, the game scene obtaining module comprises:

a scene template obtaining sub-module for obtaining the scene template of the target game scene from the preset scene template database according to an identifier of a user-selected scene template;

a scene object obtaining sub-module for obtaining the scene object in the target game scene from the preset scene object database according to an identifier of a user-selected scene object;

a location determining sub-module for determining the location of the scene object in the target game scene according to an edition instruction or a saving instruction for the scene object in the target game scene;

a scene object display sub-module for obtaining display effect of the scene object in the target game scene from a preset scene object display effect database according to the scene object in the target game scene and the location of the scene object in the target game scene, and displaying, in the scene template of the target game scene, the scene object in the target game scene in a manner of the obtained display effect according to the determined location of the scene object; and a scene object rendering sub-module for determining illumination effect of the scene object in the target game scene according to the determined location of the scene object and illumination parameters of a game engine itself, and rendering the scene object in the target game scene in a manner of the determined illumination effect and thus obtaining the target game scene.

In a specific implementation of the present application, the device for downloading game data further comprises:

a scene data generating module for generating scene data of the target game scene according to the target game scene, wherein, the scene data of the target game scene at least comprises: an identifier of a scene template of the target game scene, an identifier of a scene object in the target game scene and location information of the scene object in the target game scene; and a first data storing module for storing the scene data.

In a specific implementation of the present application, the scene object obtaining sub-module comprises:

a scene object identifier determining means for determining identifiers of user-selectable scene objects according to user attribute information of a user; and a scene object obtaining means for obtaining the scene object in the target game scene from the preset scene object database according to an identifier of a scene object selected by the user from the identifiers of the user-selectable scene objects.

To achieve the above objectives, embodiments of the present application disclose a device for reconstructing game data, which comprises:

a scene information obtaining module for obtaining an identifier of a scene template of a target game scene, an identifier of a scene object in the target game scene and location information of the scene object in the target game scene;

a second scene template obtaining module for obtaining the scene template of the target game scene from a preset scene template database according to the identifier of the scene template of the target game scene;

a second scene object obtaining module for obtaining the scene object in the target game scene from a preset scene object database according to the identifier of the scene object in the target game scene;

a scene object display module for obtaining display effect of the scene object in the target game scene from a preset scene object display effect database according to the scene object in the target game scene and the location information of the scene object in the target game scene, and displaying, in the scene template of the target game scene, the scene object in the target game scene in a manner of the obtained display effect according to the location information of the target scene object; and a second scene object rendering module for determining illumination effect of the scene object in the target game scene according to the location information of the scene object in the target game scene and illumination parameters of a game engine itself, and rendering the scene object in the target game scene in a manner of the determined illumination effect, and thus completing the reconstruction of the target game scene.

In a specific implementation of the present application, the device for reconstructing game data further comprises:

an edition operation performing module for performing an edition operation for the target game scene after the reconstruction of the target game scene is completed; and a scene data updating module for updating scene data of the target game scene according to the edition operation, wherein, the scene data at least comprises: the identifier of the scene template of the target game scene, the identifier of the scene object in the target game scene and the location information of the scene object in the target game scene.

In a specific implementation of the present application, the device for reconstructing game data further comprises:

a storage space detecting module for detecting whether current remaining storage space is larger than a preset threshold; and a second data storage module for storing all data of the target game scene after the reconstruction in the case that the detection result from the storage space detecting module is true.

It can be seen from the above that in the solutions provided by the embodiments of the present application, the location information of a scene object in the game scene to be downloaded can be used in combination with illumination parameters of a game engine itself to determine illumination effect of the scene object in the game scene to be downloaded, the identifier of the scene object in the game scene to be downloaded can be used in combination with the location information of the scene object in the game scene to be downloaded and a preset scene object display effect database to determine display effect of the scene object in the game scene to be downloaded. Thus, when downloading data of a game scene to be downloaded, it is only necessary to obtain from a destination end the identifier of a scene template of the game scene to be downloaded, the identifier of a scene object in the game scene to be downloaded and the location information of the scene object in the game scene to be downloaded, so as to complete data downloading of the game scene to be downloaded. As compared to the prior art in which the additional requirements of downloading information such as display effects of scene objects and illumination effects of scene objects when downloading data of a game scene to be downloaded, the amount of data required to be downloaded can be decreased, data downloading time can be reduced and the user experience is improved when downloading data of a game scene with the application of the solutions provided by the embodiments of the present application.

BRIEF DESCRIPTION OF THE DRAWINGS

In order to describe the technical solutions in the embodiments of the present application or in the prior art more clearly, appended drawings required to describe the embodiments of the present application or in the prior art will be briefly described below. Obviously, the appended drawings described below are only for some embodiments of the present application, and those skilled in the art can obtain other drawings according to these drawings without any creative effort.

DETAILED DESCRIPTION

Technical solutions in the embodiments of the present application will be described below clearly and completely in combination with the appended drawings of the embodiments of the present application. Obviously, the described embodiments are only some of the embodiments of the present application, rather than all of the embodiments. Any other embodiment obtained based on the embodiments of the present application by those skilled in the art without doing creative works falls into the protection scope of the present application.

Figure 1:
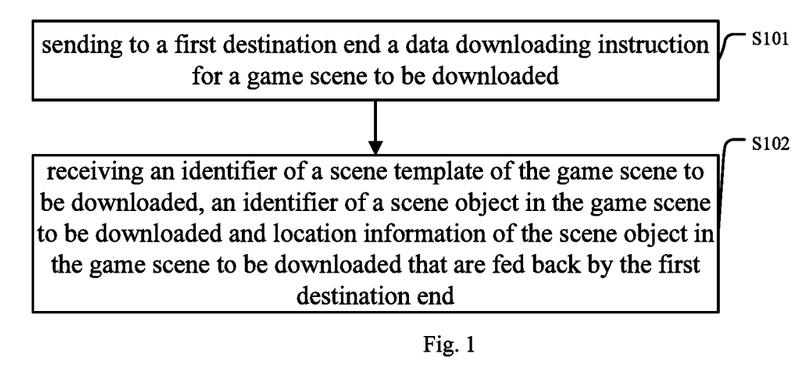
FIG. 1 is a schematic flowchart of a method for downloading game data provided by an embodiment of the present application.

FIG. 1 is a structural schematic view of a device for downloading game data provided by an embodiment of the present application, the method comprises:

S101: sending to a first destination end a data downloading instruction for a game scene to be downloaded.

A game scene can be simply understood as game environment in which the corresponding game character is present when a user is playing a game via a game client, such as game maps for battling set by a system or each user in battle games, and room arrangements and game characters etc., arranged by users in a pretending game and the like.

The first destination end described above can be a server and can also be a client, to which the present application is not limited.

Moreover, the data downloading instruction is at least required to include an identifier of a game scene to be downloaded, which can facilitate the first destination end to determine the game scene to be downloaded. Of course, the data downloading instruction can further include other information to which present application is not limited. In particular, a scene template can be a scene template with trenches and a scene template with buildings. Each scene template corresponds to a number, i.e., the identifier of the scene template.

S102: receiving an identifier of a scene template of the game scene to be downloaded, an identifier of a scene object in the game scene to be downloaded and location information of the scene object in the game scene to be downloaded that are fed back by the first destination end.

It should be noted that the location information of a scene object in the game scene to be downloaded is used in combination with illumination parameters of a game engine itself to determine illumination effect of the scene object in the game scene to be downloaded, and the identifier of the scene object in the game scene to be downloaded is used in combination with the location information of the scene object in the game scene to be downloaded and a preset scene object display effect database to determine display effect of the scene object in the game scene to be downloaded.

After a client receives an identifier of a scene template of the game scene to be downloaded, an identifier of a scene object in the game scene to be downloaded and location information of the scene object in the game scene to be downloaded that are fed back by the first destination end, it is possible to first only store the data locally rather than displaying the game scene to be downloaded to users, and to display the game scene to be downloaded described above to users only when display is needed.

When displaying the game scene to be downloaded described above to users, it is necessary to reconstruct the game scene to be downloaded first according to the information fed back by the first destination end described above and then it is possible to display the game scene to be downloaded to users.

In particular, in a preferred implementation of the present application, after receiving an identifier of a scene template of the game scene to be downloaded, an identifier of a scene object in the game scene to be downloaded and location information of the scene object in the game scene to be downloaded that are fed back by the first destination end, the method further comprises:

obtaining the scene template of the game scene to be downloaded from a preset scene template database according to the identifier of the scene template of the game scene to be downloaded;

obtaining the scene object in the game scene to be downloaded from a preset scene object database according to the identifier of the scene object in the game scene to be downloaded;

determining illumination effect of the scene object in the game scene to be downloaded according to the location information of the scene object in the game scene to be downloaded and illumination parameters of the game engine itself;

determining display effect of the scene object in the game scene to be downloaded according to the scene object in the game scene to be downloaded, the location information of the scene object in the game scene to be downloaded and the preset scene object display effect database; and displaying, in the scene template of the game scene to be downloaded, the scene object in the game scene to be downloaded in a manner of the determined display effect of the scene object, and rendering the scene object in the game scene to be downloaded in a manner of the determined illumination effect of the scene object, according to the location of the scene object in the game scene to be downloaded.

It should be noted that the way to reconstruct a game scene to be downloaded is similar to the method for reconstructing game data provided by the embodiment as shown in the following FIG. 4 and is not described in detail here now.

It should be noted that there are two ways to download data and reconstruct game scenes by applying the solutions provided by the embodiments of the present application.

In the first way: after sending to a destination end a data downloading instruction for a game scene to be downloaded, a client first obtains all the required information from the destination end, including an identifier of a scene template of the game scene to be downloaded, an identifier of a scene object in the game scene to be downloaded and location information of the scene object in the game scene to be downloaded that are fed back by the first destination end, for reconstructing the game scene to be downloaded, and then reconstructs the game scene to be downloaded according to the downloaded information described above. Wherein, the reconstruction of a game scene to be downloaded according to the downloaded information described above can be automatically initiated after the client detects that data download is complete, and can also be initiated after a user's instruction is received, for example, a user clicked a "scene display" button.

In the second way, after sending to a destination end a data downloading instruction for a game scene to be downloaded, a client first obtains a part of the required information for reconstructing the game scene to be downloaded. In this way, the client can first start to reconstruct the game scene to be downloaded according to the downloaded information and then continue to download other required information for reconstructing the game scene to be downloaded during the reconstruction, which presents users with a process of reconstructing the game scene in real time and leads to a better user experience. For example, a client downloads a game map from a destination end as follows: after sending a downloading instruction to a destination end, the client obtains the template identifier of the game map, and starts to build a room corresponding to the game map according to the template identifier, and then continues to obtain the identifiers of objects contained in the room from the destination end during the process of building the room, and after the building of the room completes, establishes various objects in the room successively and establishes illumination effects, display effects and the like of objects according to information such as locations of objects and the like.

It can be seen from above that, in the solutions provided by the present embodiment, since the location information of a scene object in the game scene to be downloaded can be used in combination with illumination parameters of a game engine itself to determine illumination effect of the scene object in the game scene to be downloaded, and the identifier of the scene object in the game scene to be downloaded can be used in combination with the location information of the scene object in the game scene to be downloaded and a preset scene object display effect database to determine display effect of the scene object in the game scene to be downloaded, when data of a game scene to be downloaded is downloaded, it is only necessary to obtain an identifier of a scene template of the game scene to be downloaded, an identifier of a scene object in the game scene to be downloaded and location information of the scene object in the game scene to be downloaded from a destination end, so as to complete data downloading of the game scene to be downloaded. As compared to the additional requirement of downloading information such as display effects of scene objects and illumination effects of scene objects when downloading data of a game scene to be downloaded in the prior art, the amount of data required to be downloaded can be decreased, data downloading time can be reduced and the user experience is improved when downloading data of a game scene by applying the solutions provided by the present embodiment.

The processes of downloading data of a game scene and reconstructing the game scene by a client will be described in detail below with a specific example.

Figure 2:
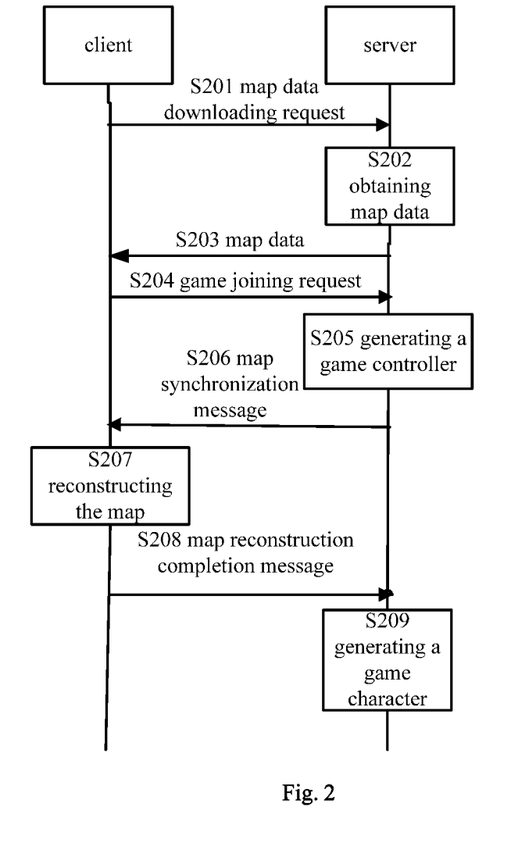
FIG. 2 is a schematic signaling flowchart of a method for downloading map data provided by an embodiment of the present application.

The game scene in this example is a game map, referring to FIG. 2, which provides a schematic signaling flowchart of a method for downloading map data.

If users wish to join a self-made map and play a game together, a user A establishes a customized game room, a user B and user C, etc. click to enter the game room, and a client and a server automatically complete the processes of downloading map information and establishing the map. A client sends a map data downloading request to a server (S201); the server, after receiving the map data downloading request, obtains a map template identifier of map data, identifiers of map objects in the map and locations of map objects in the map (S202); the sever sends the obtained above information to the client (S203); the client sends a game joining request to the server after receiving the above information (S204); the server, after receiving the game joining request sent by the client, performs information verification to confirms the successful join of the client in the game and generates a game controller for the corresponding user of the client (S205) so as to control the corresponding user's game character of the client by the generated character controller; the server sends a map synchronization message to the client (S206); the client, after receiving the map synchronization message, reconstructs the map with reference to the solution for reconstructing a scene as shown in FIG. 1 according to the information received in step S202 (S207), and sends a map reconstruction completion message to the server after the reconstruction of the map is completed (S208); the server, after receiving the map reconstruction completion message, generates the game character corresponding to the map (S209), so as to enable the corresponding user of the client to successfully start to enter the game.

Besides, there are no particular sequence for a client to send a map data downloading request and send a game joining request. In one specific embodiment, a client sends a map data downloading request to a server while sending a game joining request to the server.

It can be understood that it should be also possible for a user to upload data of a game scene to a destination end by a client and share data of the game scene generated by other users since a user can download data of a game scene from a destination end by a client and share self-generated data of the game scene to other users.

Figure 3:
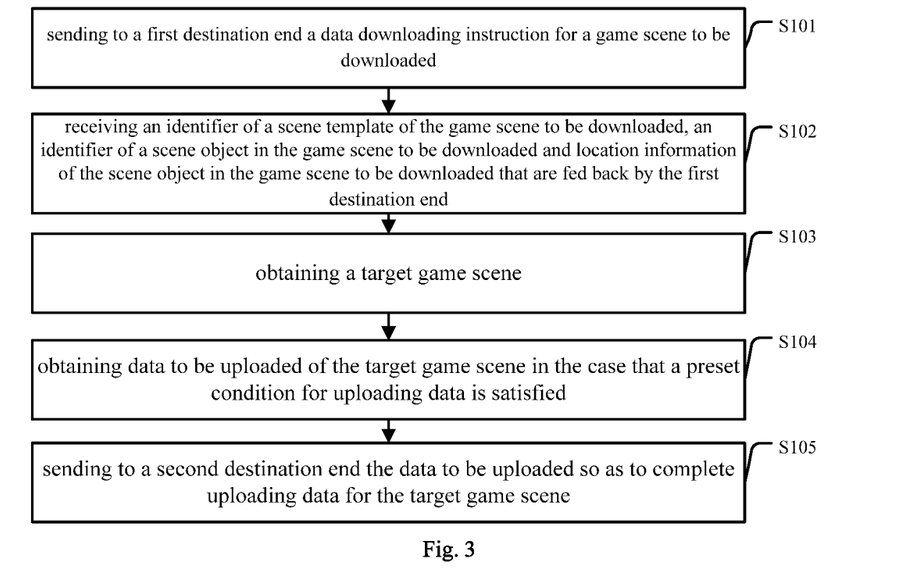
FIG. 3 is a schematic flowchart of another method for downloading game data provided by an embodiment of the present application.

Based on this, in a specific implementation of the present application with reference to FIG. 3, which provides schematic flowchart of another method for downloading game data, as compared to the previous embodiment, in this embodiment, the method for downloading game data described above further comprises:

S103: obtaining a target game scene.

In a preferred implementation of the present application, the target scene object can be obtained by the following steps which specifically comprise:

obtaining the scene template of the target game scene from the preset scene template database according to an identifier of a user-selected scene template;

obtaining the scene object in the target game scene from the preset scene object database according to an identifier of a user-selected scene object;

determining the location of the scene object in the target game scene according to an edition instruction or a saving instruction for the scene object in the target game scene;

obtaining display effect of the scene object in the target game scene from a preset scene object display effect database according to the scene object in the target game scene and the location of the scene object in the target game scene, and displaying, in the scene template of the target game scene, the scene object in the target game scene in a manner of the obtained display effect according to the determined location of the scene object; and determining illumination effect of the scene object in the target game scene according to the determined location of the scene object and illumination parameters of a game engine itself, and rendering the scene object in the target game scene in a manner of the determined illumination effect and thus obtaining the target game scene.

In a specific example, when a game scene is a game map, a game client can provide users with a function of designing game maps by themselves. A user can activate a map edition function after opening the client. Normally, the game client will provide the user with one scene template, and then the user can draw terrains on the scene template, for example, by adding a tree, disposing a box, setting the birth place of a monster. After the user finishes editing the map, the edited map can be stored in a local folder or be uploaded to a server by the game client. In order to realize the map edition function, it is necessary for a game client to preset a game template database in which scene templates are stored. Wherein, a scene template can be a scene template with trenches and a scene template with buildings and the like. Each scene template corresponds to a number, i.e., the identifier of the scene template.

In particular, the edition instruction for a scene object described above can be an instruction such as for moving, rotating, zooming, copying, pasting, deleting the scene object, and moreover, it can also be an instruction such as for digging, covering the scene object etc., and the present application is not limited for the specific form of the edition instruction.

In actual applications, different users may have different levels or different interests for one game. In this case, it is possible to provide targeted identifiers of user-selectable the scene objects to users according to actual conditions. For example, various scene object packages are provided to users for selection and download by users.

In a preferred implementation of the present application, the step of obtaining a scene object of the target game scene from a preset scene object database according to an identifier of a user-selected scene object can be carried out by determining identifiers of user-selectable scene objects according to user attribute information of a user and obtaining the scene object in the target game scene from the preset scene object database according to an identifier of a scene object selected by the user from the identifiers of the user-selectable scene objects.

In particular, the user-selectable scene objects determined according to user attribute information of a user can be all the scene objects in a preset scene object database, and also can be a part of scene objects in a preset scene object database. The user-selectable scene objects will be described for two different cases below.

In the first case, in which the determined user-selectable scene objects are all the scene objects in a preset scene object database, the number of user-selectable scene objects is relatively large and it is comparatively time-consuming for users to select.

In a specific implementation, it is possible to select several kinds of scene objects according to difficulty levels of usage of various scene objects and user level of a user and to provide the user with identifiers of these selected scene objects preferably.

In another implementation, it is possible to collect history data generated in processes of generating scene objects or playing a game by a user, analyze the collected data, select several scene objects from a preset scene object database according to analysis results and provide the user with identifiers of these selected scene objects preferably. For example, scene objects are sorted according to their popularity levels rated by all users in the whole network or scene objects used by a user in a recent period of time are sorted according to a time order.

In the second case, in which the determined user-selectable scene objects are a part of scene objects in a preset scene object database, it is possible to determine the object category to which user-selectable scene objects belong according to one or more information, such as category of a user, the corresponding character attributes of the user, and history data generated in processes of generating scene objects or playing a game by the user, and then provide the user with identifiers of scene objects belonging to this object category in the preset scene object database.

For example, in a battle game, if it is found that a user is more interested in tactics according to history data generated when the user is in the process of playing a game, it can be determined that user-selectable scene objects are scene objects of a battle structure type and identifiers of scene objects of this type in a preset scene object database are provided to the user; and if it is found that a user requires a higher level of aesthetics to scene objects according to history data of user's scene object, it can be determined that user-selectable scene objects are scene objects with abundant textures and diversified morphology and identifiers of scene objects of this type in a preset scene object database are provided to the user.

It should be noted that the present application is illustrated only by example of the above description and the specific instances of user-selectable scene objects determined according to user attribute information of users in the actual applications are not only limited to the instances described above, to which the present application is not limited.

Moreover, the target game scene can be obtained by huge and complex UED edition maps in the prior art and the present application is not limited to the specific way of obtaining a target game scene.

In an alternative implementation of the present application, the scene object described above can be a part of scene objects provided in UED edition maps, such as scene objects in 3D view and view angle, scene objects of a basic body, scene objects of a stuff and scene objects of weather and the like.

S104: obtaining data to be uploaded of the target game scene in the case that a preset condition for uploading data is satisfied.

Wherein, the data to be uploaded at least comprises: an identifier of a scene template of the target game scene, an identifier of a scene object in the target game scene and location information of the scene object in the target game scene, and the location information of the scene object in the target game scene is used in combination with illumination parameters of a game engine itself to determine illumination effect of the scene object in the target game scene, the identifier of the scene object in the target game scene is used in combination with the location information of the scene object in the target game scene and the preset scene object display effect database to determine display effect of the scene object in the target game scene.

It can be understood that a game may have different game modes with the advancement of game progress when the game is played by a user, and thus, game scenes generated via a client by a user are game scenes for different game modes. Further, in order to achieve better game effects, it is possible to set different verification conditions for various game modes so as to ensure that game scenes generated via clients by users according to their needs satisfy requirements.

In particular, the step of obtaining data to be uploaded of the target game scene in the case that a preset condition for uploading data is satisfied can be carried out by verifying whether the target game scene satisfies a preset verification condition corresponding to a current game mode and if yes, obtaining the data to be uploaded of the target game scene.

In an alternative implementation of the present application, information for verification can be extracted from target game scenes according to a preset verification condition. For example, when a target game scene is a battle map, information for verification can be camps, birth points, map size and the like, this information, after being extracted, is matched with a preset verification condition corresponding to the current game mode, and if match is successful, it is indicated that verification passes.

In another possible implementation of the present application, it is possible for a client to verify whether target game scenes satisfy a preset verification condition corresponding to the current game mode according to verification results from a server. In particular, a client extracts information for verification from a target game scene, and sends the extracted information and the current game mode to a server. The server, after receiving the above information, verifies whether the information extracted by the client satisfies a preset verification condition corresponding to the current game mode and feeds back the verification result to the client, the client then performs verification according to received verification result. When verification is carried out by the method provided in this implementation, it is only necessary to change, if desired, preset verification conditions in servers, which can effectively avoid instances in which game scene data uploaded by clients do not satisfy requirements of current game modes for example due to that verification conditions are not timely synchronized.

S105: sending to a second destination end the data to be uploaded so as to complete uploading data for the target game scene.

The second destination end described above can be or not be the same with the first destination end described above. Moreover, the second destination end can be a server and can also be a client, to which the present application is not limited.

It is also possible to store scene data of the target game scene after a target game scene is obtained, so as to facilitate sharing this game scene to other users and editing this game scene again. In view of this, in a preferred implementation of the present application, the method for downloading game data described above can further comprise:

generating corresponding scene data according to the obtained target game scene described above, wherein, the scene data of the target game scene at least comprises: an identifier of a scene template of the target game scene, an identifier of a scene object in the target game scene and location information of the scene object in the target game scene; and then storing the scene data.

In a best preferred embodiment, the scene data of the target game scene may only include an identifier of a scene template of the target game scene, an identifier of a scene object in the target game scene and the location information of the scene object in the target game scene, and then the scene data are stored. In this way, the amount of data is small and it is easy to distribute the scene data. Although only an identifier of a scene template of a target game scene, an identifier of a scene object in the target game scene and the location information of the scene object in the target game scene are stored when storing data of the target game scene, it can be seen from the previous description that, it is possible to reconstruct the target game scene described above by means of these stored information according to the preset scene template database, the preset scene object database, the preset scene object display effect database and the illumination parameters of the game engine itself. In this way, the amount of data for a target game scene to be stored is reduced significantly. The storage space by the among of data can be as small as an order of KB, thereby the time that it takes to upload a target game scene to a server or other clients by a user through the client or the time that it takes to download a game scene from a server or other clients can be reduced significantly.

Moreover, a plurality of game scenes can be generated and stored locally during the process of playing a game by a user. Although only one game scene stored locally is currently used, it is possible to use other game scenes stored locally when user's needs change. In this case, scenes that a user needs can only be recovered according to information such as an identifier of a scene template of a locally stored game scene, an identifier of a scene object, location of the scene object. Although databases needed during scene recovering process are located locally, it still takes some time. In view of the above specific instance, in a specific implementation of the present application, the method for downloading game data can further comprise:

detecting whether current remaining storage space is larger than a preset threshold, if yes, which means that current remaining storage space is sufficient, it is possible to store all data of the target game scene in this case. In this way, when reconstructing the target game scene, it is not necessary to obtain other information required one by one to reconstruct the target game scene according the identifier of the scene template of a target game scene, the identifier of the scene object and the location of the scene object, thereby increasing the speed of displaying the target game scene for users.

Since a plurality of game scenes can be stored locally, in an alternative implementation of the present application, scene data of a target game scene can also comprise an identifier of the target game scene. In this way, it is possible to distinguish the target game scene from other game scenes by means of the identifier of the target game scene. For example, the identifier of a target game scene can be a user-defined file name.

It can be known from above that, in the solutions provided by various embodiments, although a client only uploads an identifier of a scene template of a target game scene, an identifier of a scene object in the target game scene and location information of the scene object in the target game scene, it still can fulfill the data upload for the target game scene since the location information of the scene object in the target game scene is used in combination with illumination parameters of a game engine itself to determine illumination effect of the scene object in the target game scene, the identifier of the scene object in the target game scene is used in combination with the location information of the scene object in the target game scene and the preset scene object display effect database to determine display effect of the scene object in the target game scene. Obviously, compared with the prior art in which it is required to upload all data of a game scene during the uploading of game scene data, uploading game data with solutions provided by above various embodiments can largely decrease the amount of data during the uploading of game scene data and reduce the time that it takes to upload game scene data.

Take a game map as an example of a game scene. Some Internet games in the prior art (comprising console games with a Networking function) is provided with a map making function. Since the map file information comprises contents of all aspects such as objects, logic, map structures, illumination and the like, the map file is large and it is only possible for a plurality of players to join a battle when all the contents of this map are manually put into a specific file folder after downloaded in online communities, forums or games and then the map file is invoked by the local client. Moreover, bandwidths and time costs for uploading map files and for other players to download map files are large and the waiting time is long, and thus it is not suitable for popularizing. The present application effectively resolves the problems caused by large map files that cause the storing, uploading and sharing of battles extremely slow and inconvenient, and sizes of map files generated in the present application are in an order of KB and very small.

Based on the method for downloading game data described above, embodiments of the present application also provide a method for reconstructing game data.

Figure 4:
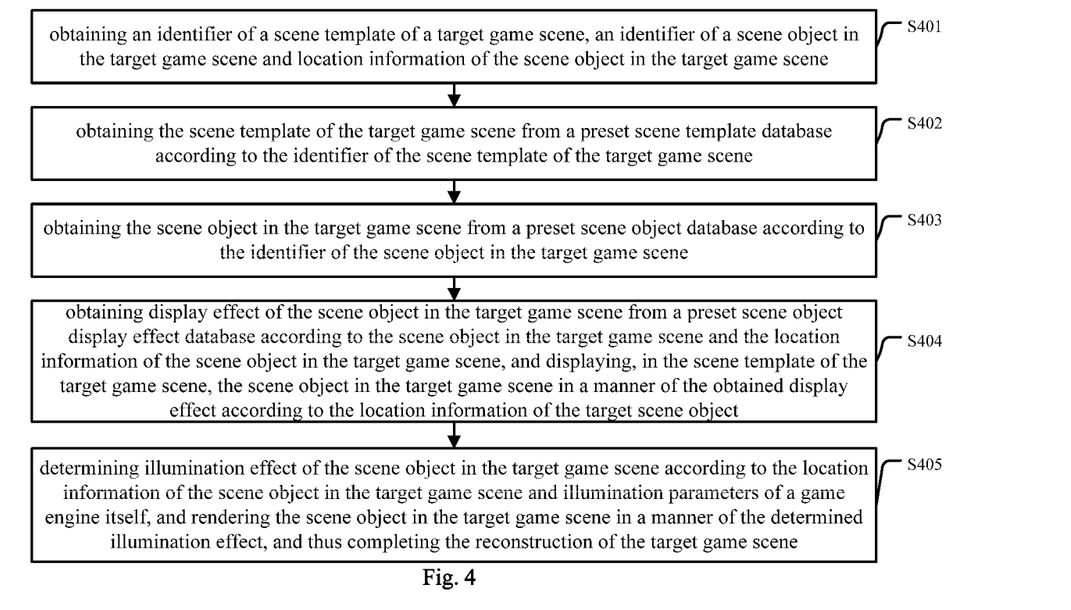
FIG. 4 is a schematic flowchart of a method for reconstructing game data provided by an embodiment of the present application.

FIG. 4 is a structural flowchart a method for reconstructing game data provided by an embodiment of the present application, the method comprises:

S401: obtaining an identifier of a scene template of a target game scene, an identifier of a scene object in the target game scene and location information of the scene object in the target game scene.

In a specific implementation, the identifier of a scene template of a target game scene, the identifier of a scene object in the target game scene and the location information of the scene object in the target game scene can be obtained from information locally stored in a client, for example, directly read from one file locally stored in a client, extracted from all scene data of the game scene locally stored in a client.

In another specific implementation, the identifier of a scene template of a target game scene, the identifier of a scene object in the target game scene and the location information of the scene object in the target game scene can also obtained by downloading from a server or other clients by a client.

The above description of the present application is illustrative only, and the method for obtaining above information in the actual applications is not only limited to this.

It is worth mentioning that, the location information of a scene object in a target game scene not only comprises coordinate information of the scene object, but also comprises information such as orientation of the scene object.

S402: obtaining the scene template of the target game scene from a preset scene template database according to the identifier of the scene template of the target game scene.

It is firstly required to determine the scene background of this game scene during the reconstruction of game scenes. Wherein, the scene background can be understood as a background content picture of the game scene, such as a building room without furnishings, a thatch room without furnishings, a trench without barriers. It can be understood that the related scene backgrounds for games can often be extracted beforehand. Thus, in the solutions provided by the embodiments of the present application, scene backgrounds that may be used are stored in a database in the form of scene templates. In this way, when game scenes are reconstructed, the complex and changeable game scenes can be reconstructed by directly selecting corresponding scene templates contained in this database according to identifiers of scene templates of target game scenes. Moreover, the number of scene templates contained in this database is larger than or equal to 1.

It can be seen from the above description that, the scene background of a scene object can be understood as a background content picture of the scene object. When a game scene is reconstructed, only after the background content picture of the game scene is determined, scene objects, such as barriers, furnishings, objects, can be further determined based on the determined background content picture so as to finish the generation of game scenes.

S403: obtaining the scene object in the target game scene from a preset scene object database according to the identifier of the scene object in the target game scene.

The game scene often comprises various scene objects in addition to a scene background. When generating a game scene, these scene objects are often added on a scene background according to user's selection. For example, for a battle game, scene objects can be barriers, blasting areas and the like; for a pretending game, scene objects can be sofas, curtains, clothes and the like. Correspondingly, when reconstructing game scenes, it is necessary to recover scene objects into locations set by users when generating the game scenes.

In a preferred implementation of the present application, the scene objects described above can be objects.

It can be understood that, for a game, scene objects that can be provided to users are often definite. Thus, in the solutions provided by the present embodiment, the scene objects that can be provided to users are stored in a database. In this way, when game scenes are reconstructed, it is possible to directly obtain the scene objects needed from this database according to identifiers of scene objects in the target game scene.

It should be noted that the present application is not limited to the execution sequence between S402 and S403, and thus S402 can be executed before, after or simultaneously with S403.

S404: obtaining display effect of the scene object in the target game scene from a preset scene object display effect database according to the scene object in the target game scene and the location information of the scene object in the target game scene, and displaying, in the scene template of the target game scene, the scene object in the target game scene in a manner of the obtained display effect according to the location information of the target scene object.

It can be understood that each scene object can be provided with a plurality of display effects. It is possible to predefine a display condition for each display effect of the scene object and store these display effects in a database in the actual applications. During the process of reconstructing a game scene, if a display condition for a certain display effect of the scene object is satisfied, a corresponding display effect is obtained from the database.

In a preferred implementation of the present application, display conditions for scene objects can be display conditions related to the location information of the scene objects.

In particular, a scene object can be flame with at least two display effects as follows: a rest state and a firing state, wherein, the display condition corresponding to the rest state is that the flame is in a non-sky area, and the display condition corresponding to the firing state is that the flame is in a sky area. When a game scene is reconstructed, if this scene object "flame" is on the ground area in the scene template, which is obviously a non-sky area, and then the display condition corresponding to the rest state is satisfied, then the flame is displayed in the rest state; and if this scene object "flame" is in the sky area in the scene template, which obviously satisfies the display condition corresponding to the rest state, then the flame is displayed in the firing state.

Of course, the above description of the present application is only illustrative, in the actual applications, the display conditions of scene objects cannot only be display conditions related to locations of scene objects, to which the present application is not limited.

S405: determining illumination effect of the scene object in the target game scene according to the location information of the scene object in the target game scene and illumination parameters of a game engine itself, and rendering the scene object in the target game scene in a manner of the determined illumination effect, and thus completing the reconstruction of the target game scene.

It should be noted that the present application is not limited to the execution sequence between displaying a scene object of a target game scene in a scene template of the target game scene and rendering the scene object in the target game scene.

In a specific implementation of the present application, after reconstructing a target game scene, the method for reconstructing game data described above can further comprise:

detecting whether current remaining storage space is larger than a preset threshold, if yes, which means that current remaining storage space is sufficient, it is possible to store all data of the target game scene after the reconstruction in this case. In this way, when the target game scene needs to be reconstructed again later, it is not necessary to repeat above steps of S401 to S405 again, which can increase the speed of displaying the target game scene for a user.

Further, in a preferred implementation of the present application, the method for reconstructing game data described above can further comprise: performing an edition operation for a target game scene after the reconstruction of the target game scene is completed. After the target game scene is edited by a user, its corresponding scene data may vary, so it is also necessary to update scene data on the target game scene according to the edition operation of the user. Wherein, the scene data at least comprises the identifier of the scene template of the target game scene, the identifier of the scene object in the target game scene and the location information of the scene object in the target game scene.

Wherein, performing an edition operation for a target game scene can comprise: changing the location of the existing scene object, deleting the existing scene object and adding a scene object and the like, to which the present application is not limited.

It can be seen from the above description that, a preset scene template database, a preset scene object database, and a preset scene object display effect database are utilized when game scenes is reconstructed with solutions provided by various embodiments described above. Since the several databases described above can be understood as encapsulation of various elements for constituting game scenes, or can be understood as encapsulation of scene object attributes and the like, in this way, with the several databases described above, it is only necessary to transfer identifiers of scene templates and identifiers of scene objects, instead of specific contents of scene templates, specific contents of scene objects and the specific contents of display effects of scene objects during the communication between different clients and servers. In this way, the concerned clients and server will still reconstruct the game scene accurately.

It can be seen from above that the display effect of a scene object in a game scene can be determined according to the scene object in the game scene, location information of the scene object in the game scene and a preset scene object display effect database, and the illumination effect of the scene object in the game scene can be determined according to the location information of a scene object in the game scene and illumination parameters of a game engine itself. Thus, it is only necessary to obtain an identifier of a scene template of a game scene, an identifier of a scene object of the game scene and location information of the scene object in the game scene when the game scene is reconstructed with solutions provided by the present embodiments. Compared with the prior art, the information required to be obtained is much less, which can reduce the time that it takes to obtain scene data during the reconstruction of game scenes.

Corresponding to the above-mentioned method for downloading game data, embodiments of the present application also provide a device for downloading game data.

Figure 5:
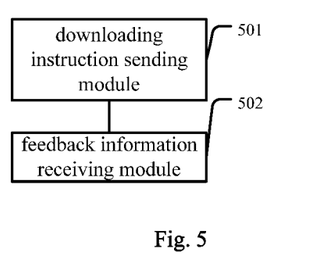
FIG. 5 is a structural schematic view of a device for downloading game data provided by an embodiment of the present application.

FIG. 5 is a structural schematic view of a device for downloading game data provided by an embodiment of the present application, the device comprises:

a downloading instruction sending module 501 for sending to a first destination end a data downloading instruction for a game scene to be downloaded; and a feedback information receiving module 502 for receiving an identifier of a scene template of the game scene to be downloaded, an identifier of a scene object in the game scene to be downloaded and location information of the scene object in the game scene to be downloaded that are fed back by the first destination, wherein, the location information of the scene object in the game scene to be downloaded is used in combination with illumination parameters of a game engine itself to determine illumination effect of the scene object in the game scene to be downloaded, and the identifier of the scene object in the game scene to be downloaded is used in combination with the location information of the scene object in the game scene to be downloaded and a preset scene object display effect database to determine display effect of the scene object in the game scene to be downloaded.

In particular, the device for downloading game data can further comprise:

a first scene template obtaining module for obtaining the scene template of the game scene to be downloaded from a preset scene template database according to the identifier of the scene template of the game scene to be downloaded after the feedback information is received by the feedback information receiving module;

a first scene object obtaining module for obtaining the scene object in the game scene to be downloaded from a preset scene object database according to the identifier of the scene object in the game scene to be downloaded;

an illumination effect determining module for determining illumination effect of the scene object in the game scene to be downloaded according to the location information of the scene object in the game scene to be downloaded and illumination parameters of the game engine itself;

a display effect determining module for determining display effect of the scene object in the game scene to be downloaded according to the scene object in the game scene to be downloaded, the location information of the scene object in the game scene to be downloaded and the preset scene object display effect database; and a first scene object rendering module for displaying, in the scene template of the game scene to be downloaded, the scene object in the game scene to be downloaded in a manner of the determined display effect of the scene object according to the location of the scene object in the game scene to be downloaded, and rendering the scene object in the game scene to be downloaded in a manner of the determined illumination effect of the scene object.

It can be seen from above that, in the solutions provided by the present embodiment, since the location information of a scene object in the game scene to be downloaded can be used in combination with illumination parameters of a game engine itself to determine illumination effect of the scene object in the game scene to be downloaded, and the identifier of the scene object in the game scene to be downloaded can be used in combination with the location information of the scene object in the game scene to be downloaded and a preset scene object display effect database to determine display effect of the scene object in the game scene to be downloaded, when data of a game scene to be downloaded is downloaded, it is only necessary to obtain an identifier of a scene template of the game scene to be downloaded, an identifier of a scene object in the game scene to be downloaded and location information of the scene object in the game scene to be downloaded from a destination end, so as to complete data downloading of the game scene to be downloaded. As compared to the prior art in which it is necessary to download information such as display effects of scene objects and illumination effects of scene objects when downloading the data of a game scene to be downloaded, the amount of data required to be downloaded can be decreased, data downloading time can be reduced and the user experience is improved when data of a game scene is downloaded with the application of the solutions provided by the present embodiment.

Figure 6:
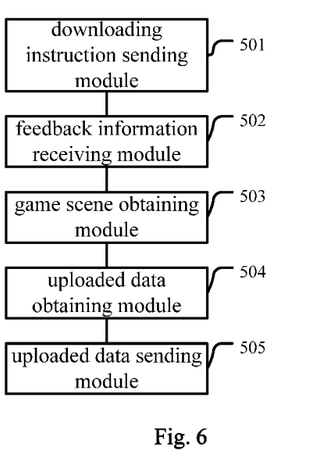
FIG. 6 is a structural schematic view of another device for downloading game data provided by an embodiment of the present application.

In a specific implementation of the present application with reference to FIG. 6, which provides a structural schematic view of another device for downloading game data, as compared to the previous embodiment, the device for downloading game data described above in this embodiment further comprises:

a game scene obtaining module 503 for obtaining a target game scene;

an uploaded data obtaining module 504 for obtaining data to be uploaded of the target game scene in the case that a preset condition of uploading data is satisfied, wherein, the data to be uploaded at least comprises: an identifier of a scene template of the target game scene, an identifier of a scene object in the target game scene and location information of the scene object in the target game scene, the location information of the scene object in the target game scene is used in combination with illumination parameters of a game engine itself to determine illumination effect of the scene object in the target game scene, the identifier of the scene object in the target game scene is used in combination with the location information of the scene object in the target game scene and the preset scene object display effect database to determine display effect of the scene object in the target game scene; and an uploaded data sending module 505 for sending to a second destination end the data to be uploaded so as to complete uploading data for the target game scene.

In particular, the uploaded data obtaining module 504 can comprise:

a game scene verifying sub-module for verifying whether the target game scene satisfies a preset verification condition corresponding to a current game mode; and an uploaded data obtaining sub-module for obtaining the data to be uploaded of the target game scene in the case that the verification result from the game scene verifying sub-module is true.

In particular, the game scene obtaining module 503 can comprise:

a scene template obtaining sub-module for obtaining the scene template of the target game scene from the preset scene template database according to an identifier of a user-selected scene template;

a scene object obtaining sub-module for obtaining the scene object in the target game scene from the preset scene object database according to an identifier of a user-selected scene object;

a location determining sub-module for determining the location of the scene object in the target game scene according to an edition instruction or a saving instruction for the scene object in the target game scene;

a scene object display sub-module for obtaining display effect of the scene object in the target game scene from a preset scene object display effect database according to the scene object in the target game scene and the location of the scene object in the target game scene, and displaying, in the scene template of the target game scene, the scene object in the target game scene in a manner of the obtained display effect according to the determined location of the scene object; and a scene object rendering sub-module for determining illumination effect of the scene object in the target game scene according to the determined location of the scene object and illumination parameters of a game engine itself, and rendering the scene object in the target game scene in a manner of the determined illumination effect and thus obtaining the target game scene.

In particular, the device for downloading game data further comprises:

a scene data generating module for generating scene data of the target game scene according to the target game scene, wherein, the scene data of the target game scene at least comprises: an identifier of a scene template of the target game scene, an identifier of a scene object in the target game scene and location information of the scene object in the target game scene; and a first data storing module for storing the scene data.

In particular, the scene object obtaining sub-module can comprise:

a scene object identifier determining means for determining identifiers of user-selectable scene objects according to user attribute information of a user; and a scene object obtaining means for obtaining the scene object in the target game scene from the preset scene object database according to an identifier of a scene object selected by the user from the identifiers of the user-selectable scene objects.

It can be known from above that, in the solutions provided by various embodiments, although a client only uploads an identifier of a scene template of a target game scene, an identifier of a scene object in the target game scene and location information of the scene object in the target game scene, it can still fulfill the data upload for the target game scene since the location information of the scene object in the target game scene is used in combination with illumination parameters of a game engine itself to determine illumination effect of the scene object in the target game scene, the identifier of the scene object in the target game scene is used in combination with the location information of the scene object in the target game scene and the preset scene object display effect database to determine display effect of the scene object in the target game scene. Obviously, compared with the prior art in which it is required to upload all data of a game scene during the uploading of game scene data, uploading game data with solutions provided by above various embodiments can largely decrease the amount of data during the uploading of game data and reduce the time that it takes to upload game scene data.

Corresponding to the method for reconstructing game data described above, embodiments of the present application also provide a device for reconstructing game data.

Figure 7:
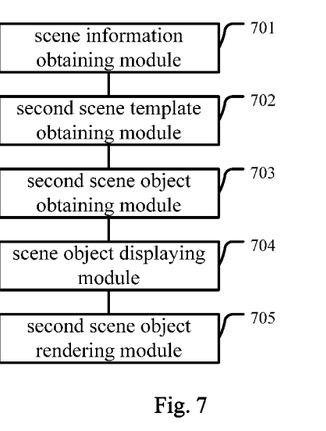
FIG. 7 is a structural schematic view of a device for reconstructing game data provided by an embodiment of the present application.

FIG. 7 is a structural schematic view of a device for reconstructing game data provided by an embodiment of the present application. The device comprises:

a scene information obtaining module 701 for obtaining an identifier of a scene template of a target game scene, an identifier of a scene object in the target game scene and location information of the scene object in the target game scene;

a second scene template obtaining module 702 for obtaining the scene template of the target game scene from a preset scene template database according to the identifier of the scene template of the target game scene;

a second scene object obtaining module 703 for obtaining the scene object in the target game scene from a preset scene object database according to the identifier of the scene object in the target game scene;

a scene object display module 704 for obtaining display effect of the scene object in the target game scene from a preset scene object display effect database according to the scene object in the target game scene and the location information of the scene object in the target game scene, and displaying, in the scene template of the target game scene, the scene object in the target game scene in a manner of the obtained display effect according to the location information of the target scene object; and a second scene object rendering module 705 for determining illumination effect of the scene object in the target game scene according to the location information of the scene object in the target game scene and illumination parameters of a game engine itself, and rendering the scene object in the target game scene in a manner of the determined illumination effect, and thus completing the reconstruction of the target game scene.

In particular, the device for reconstructing game data can further comprise:

an edition operation performing module for performing an edition operation for the target game scene after the reconstruction of the target game scene is completed; and a scene data updating module for updating scene data of the target game scene according to the edition operation, wherein, the scene data at least comprises: the identifier of the scene template of the target game scene, the identifier of the scene object in the target game scene and the location information of the scene object in the target game scene.

In particular, the device for reconstructing game data can further comprise:

a storage space detecting module for detecting whether current remaining storage space is larger than a preset threshold; and a second data storage module for storing all data of the target game scene after the reconstruction in the case that the detection result from the storage space detecting module is true.

It can be seen from above that the display effect of a scene object in a game scene can be determined according to the scene object in the game scene, location information of the scene object in the game scene and a preset scene object display effect database, and the illumination effect of the scene object in the game scene can be determined according to the location information of a scene object in the game scene and illumination parameters of a game engine itself. Thus, it is only necessary to obtain an identifier of a scene template of a game scene, an identifier of a scene object of the game scene and location information of the scene object in the game scene when reconstructing the game scene with solutions provided by the present embodiments. Compared with the prior art, the information required to be obtained is much less, which can reduce the time that it takes to obtain scene data during the reconstruction of game scenes.

The embodiments of the device are briefly described and the description of the embodiments of the method can be referred for its related contents since the embodiments of the device are substantially similar to those of the method.

It should be noted that the relationship terms herein such as "first", "second" and the like are only used to distinguish one entity or operation from another entity or operation, but do not necessarily require or imply that there is actual relationship or order between these entities or operations. Moreover, the terms "comprise", "comprise" or any variants thereof are intended to cover a non-exclusive inclusion, such that processes, methods, articles or devices comprising a series of elements not only comprise those elements listed, but also comprise other elements not specifically listed or the elements intrinsic to these processes, methods, articles, or devices. Without further limitations, elements limited by the wording "comprise(s) a/an . . . " do not exclude that there are additional identical elements in the processes, methods, articles, or devices, which comprise the listed elements.

It will be understood by one of ordinary skills in the art that all or part of the steps in the embodiments which implement the method described above can be implemented by instructing the related hardware with programs, which programs can be stored in a computer readable storage medium such as ROM/RAM, magnetic disk, optical disk.

The embodiments described above are just preferable embodiments of the present application, and are not indented to limit the protection scope of the present application. Any modifications, alternatives, improvements or the like within the spirit and principle of the present application are comprised in the protection scope of the present application.

What is claimed is:

1. A method, applicable to a client device, for obtaining game data, characterized in that the method comprises:
   sending to a first destination end a data downloading instruction for a game scene to be downloaded;
   receiving an identifier of a scene template of the game scene to be downloaded, an identifier of a scene object in the game scene to be downloaded and location information of the scene object in the game scene to be downloaded that are fed back by the first destination end, wherein, the location information of the scene object in the game scene to be downloaded is used in combination with illumination parameters of a game engine itself to determine illumination effect of the scene object in the game scene to be downloaded, and the identifier of the scene object in the game scene to be downloaded is used in combination with the location information of the scene object in the game scene to be downloaded and a preset scene object display effect database storing a plurality of display effects for scene objects, to determine display effect of the scene object in the game scene to be downloaded;
   obtaining the scene template of the game scene to be downloaded from a preset scene template database according to the identifier of the scene template of the game scene to be downloaded;
   obtaining the scene object in the game scene to be downloaded from a preset scene object database according to the identifier of the scene object in the game scene to be downloaded; and
   determining display effect of the scene object in the game scene to be downloaded according to the scene object in the game scene to be downloaded, the location information of the scene object in the game scene to be downloaded and the preset scene object display effect database; wherein, the template database, the scene object database and the scene object display effect database are local to the client device;
   wherein, the obtained scene template, the scene object and the determined display effect are used in construction of the game scene.

2. The method according to claim 1, further comprising:
   determining illumination effect of the scene object in the game scene to be downloaded according to the location information of the scene object in the game scene to be downloaded and illumination parameters of the game engine itself;
   displaying, in the scene template of the game scene to be downloaded, the scene object in the game scene to be downloaded in a manner of the determined display effect of the scene object, and rendering the scene object in the game scene to be downloaded in a manner of the determined illumination effect of the scene object, according to the location of the scene object in the game scene to be downloaded.

3. The method according to claim 1, characterized in that it further comprises:
   obtaining a target game scene;
   obtaining data to be uploaded of the target game scene in the case that a preset condition for uploading data is satisfied, wherein, the data to be uploaded at least comprises: an identifier of a scene template of the target game scene, an identifier of a scene object in the target game scene and location information of the scene object in the target game scene; wherein the location information of the scene object in the target game scene is used in combination with illumination parameters of a game engine itself to determine illumination effect of the scene object in the target game scene, the identifier of the scene object in the target game scene is used in combination with the location information of the scene object in the target game scene and the preset scene object display effect database to determine display effect of the scene object in the target game scene;
   sending to a second destination end the data to be uploaded so as to complete uploading data for the target game scene.

4. The method according to claim 3, characterized in that the step of obtaining data to be uploaded of the target game scene in the case that a preset condition for uploading data is satisfied comprises:
   verifying whether the target game scene satisfies a preset verification condition corresponding to a current game mode; and
   if yes, obtaining the data to be uploaded of the target game scene.

5. The method according to claim 3, characterized in that the step of obtaining a target game scene further comprises:
   obtaining the scene template of the target game scene from the preset scene template database according to an identifier of a user-selected scene template;

obtaining the scene object in the target game scene from the preset scene object database according to an identifier of a user-selected scene object;

determining the location of the scene object in the target game scene according to an edition instruction or a saving instruction for the scene object in the target game scene;

obtaining display effect of the scene object in the target game scene from a preset scene object display effect database according to the scene object in the target game scene and the location of the scene object in the target game scene, and displaying, in the scene template of the target game scene, the scene object in the target game scene in a manner of the obtained display effect according to the determined location of the scene object; and determining illumination effect of the scene object in the target game scene according to the determined location of the scene object and illumination parameters of a game engine itself, and rendering the scene object in the target game scene in a manner of the determined illumination effect and thus obtaining the target game scene.

6. The method according to claim 5, characterized in that it further comprises:

generating scene data of the target game scene according to the target game scene, wherein, the scene data of the target game scene at least comprises: an identifier of a scene template of the target game scene, an identifier of a scene object in the target game scene and location information of the scene object in the target game scene; and storing the scene data.

7. The method according to claim 5, characterized in that the step of obtaining a scene object in the target game scene from a preset scene object database according to an identifier of a user-selected scene object comprises:

determining identifiers of user-selectable scene objects according to user attribute information of a user; and obtaining the scene object in the target game scene from the preset scene object database according to an identifier of a scene object selected by the user from the identifiers of the user-selectable scene objects.

8. A method for reconstructing game data on a client device, characterized in that the method comprises:

obtaining an identifier of a scene template of a target game scene, an identifier of a scene object in the target game scene and location information of the scene object in the target game scene;

obtaining the scene template of the target game scene from a preset scene template database according to the identifier of the scene template of the target game scene;

obtaining the scene object in the target game scene from a preset scene object database according to the identifier of the scene object in the target game scene;

obtaining display effect of the scene object in the target game scene from a preset scene object display effect database storing a plurality of display effects for scene objects, according to the scene object in the target game scene and the location information of the scene object in the target game scene, the scene object in the target game scene in a manner of the obtained display effect according to the location information of the target scene object, wherein, the template database, the scene object database and the scene object display effect database are local to the client device; and determining illumination effect of the scene object in the target game scene according to the location information of the scene object in the target game scene and illumination parameters of a game engine itself, and rendering the scene object in the target game scene in a manner of the determined illumination effect, and thus completing the reconstruction of the target game scene with the obtained scene template and scene object and the determined illumination effect.

9. The method according to claim 8, characterized in that the method further comprises:

performing an edition operation for the target game scene after the reconstruction of the target game scene is completed; and updating scene data of the target game scene according to the edition operation, wherein, the scene data at least comprises: the identifier of the scene template of the target game scene, the identifier of the scene object in the target game scene and the location information of the scene object in the target game scene.

10. The method according to claim 8, characterized in that the method further comprises:

detecting whether current remaining storage space is larger than a preset threshold;

if yes, storing all data of the target game scene after the reconstruction.

11. A client device for downloading game data, characterized in that the device comprises:

a downloading instruction sending module configured to send to a first destination end a data downloading instruction for a game scene to be downloaded;

a feedback information receiving module configured to receive an identifier of a scene template of the game scene to be downloaded, an identifier of a scene object in the game scene to be downloaded and location information of the scene object in the game scene to be downloaded that are fed back by the first destination end, wherein, the location information of the scene object in the game scene to be downloaded is used in combination with illumination parameters of a game engine itself to determine illumination effect of the scene object in the game scene to be downloaded, and the identifier of the scene object in the game scene to be downloaded is used in combination with the location information of the scene object in the game scene to be downloaded and a preset scene object display effect database storing a plurality of display effects for scene objects, to determine display effect of the scene object in the game scene to be downloaded;

wherein, the device further comprises:

a first scene template obtaining module configured to obtain the scene template of the game scene to be downloaded from a preset scene template database according to the identifier of the scene template of the game scene to be downloaded after the feedback information is received by the feedback information receiving module;

a first scene object obtaining module configured to obtain the scene object in the game scene to be downloaded from a preset scene object database according to the identifier of the scene object in the game scene to be downloaded; and a display effect determining module configured to determine display effect of the scene object in the game scene to be downloaded according to the scene object in the game scene to be downloaded, the location information of the scene object in the game scene to be downloaded and the preset scene object display effect database;

wherein, the obtained scene template, the scene object and the determined display effect are used in construction of the game scene.

12. The device according to claim 11, further comprising:

an illumination effect determining module configured to determine illumination effect of the scene object in the game scene to be downloaded according to the location information of the scene object in the game scene to be downloaded and illumination parameters of the game engine itself;

a first scene object rendering module configured to display, in the scene template of the game scene to be downloaded, the scene object in the game scene to be downloaded in a manner of the determined display effect of the scene object, and rendering the scene object in the game scene to be downloaded in a manner of the determined illumination effect of the scene object, according to the location of the scene object in the game scene to be downloaded.

13. The device according to claim 11, characterized in that the device further comprises:

a game scene obtaining module configured to obtain a target game scene;

an uploaded data obtaining module configured to obtain data to be uploaded of the target game scene in the case that a preset condition of uploading data is satisfied, wherein, the data to be uploaded at least comprises: an identifier of a scene template of the target game scene, an identifier of a scene object in the target game scene and location information of the scene object in the target game scene; wherein the location information of the scene object in the target game scene is used in combination with illumination parameters of a game engine itself to determine illumination effect of the scene object in the target game scene, the identifier of the scene object in the target game scene is used in combination with the location information of the scene object in the target game scene and the preset scene object display effect database to determine display effect of the scene object in the target game scene; and an uploaded data sending module configured to send to a second destination end the data to be uploaded so as to complete uploading data for the target game scene.

14. The device according to claim 13, characterized in that the uploaded data obtaining module comprises:

a game scene verifying sub-module configured to verify whether the target game scene satisfies a preset verification condition corresponding to a current game mode; and an uploaded data obtaining sub-module configured to obtain the data to be uploaded of the target game scene in the case that the verification result from the game scene verifying sub-module is true.

15. The device according to claim 13, characterized in that the game scene obtaining module comprises:

a scene template obtaining sub-module configured to obtain the scene template of the target game scene from the preset scene template database according to an identifier of a user-selected scene template;

a scene object obtaining sub-module configured to obtain the scene object in the target game scene from the preset scene object database according to an identifier of a user-selected scene object;

a location determining sub-module configured to determine the location of the scene object in the target game scene according to an edition instruction or a saving instruction for the scene object in the target game scene;

a scene object display sub-module configured to obtain display effect of the scene object in the target game scene from a preset scene object display effect database according to the scene object in the target game scene and the location of the scene object in the target game scene, and displaying, in the scene template of the target game scene, the scene object in the target game scene in a manner of the obtained display effect according to the determined location of the scene object; and a scene object rendering sub-module configured to determine illumination effect of the scene object in the target game scene according to the determined location of the scene object and illumination parameters of a game engine itself, and rendering the scene object in the target game scene in a manner of the determined illumination effect and thus obtaining the target game scene.

16. The device according to claim 15, characterized in that the device further comprises:

a scene data generating module configured to generate scene data of the target game scene according to the target game scene, wherein, the scene data of the target game scene at least comprises: an identifier of a scene template of the target game scene, an identifier of a scene object in the target game scene and location information of the scene object in the target game scene; and a first data storing module configured to store the scene data.

17. The device according to claim 15, characterized in that the scene object obtaining sub-module comprises:

a scene object identifier determining means configured to determine identifiers of user-selectable scene objects according to user attribute information of a user; and a scene object obtaining means configured to obtain the scene object in the target game scene from the preset scene object database according to an identifier of a scene object selected by the user from the identifiers of the user-selectable scene objects.

18. A client device for reconstructing game data, comprising:

a scene information obtaining module configured to obtain an identifier of a scene template of a target game scene, an identifier of a scene object in the target game scene and location information of the scene object in the target game scene;

a second scene template obtaining module configured to obtain the scene template of the target game scene from a preset scene template database according to the identifier of the scene template of the target game scene;

a second scene object obtaining module configured to obtain the scene object in the target game scene from a preset scene object database according to the identifier of the scene object in the target game scene;

a scene object display module configured to obtain display effect of the scene object in the target game scene from a preset scene object display effect database storing a plurality of display effects for scene objects, according to the scene object in the target game scene and the location information of the scene object in the target game scene, and displaying, in the scene template of the target game scene, the scene object in the target game scene in a manner of the obtained display effect according to the location information of the target scene object, wherein, the template database, the scene object database and the scene object display effect database are local to the client device; and a second scene object rendering module configured to determine illumination effect of the scene object in the target game scene according to the location information of the scene object in the target game scene and illumination parameters of a game engine itself, and rendering the scene object in the target game scene in a manner of the determined illumination effect, and thus completing the reconstruction of the target game scene with the obtained scene template and scene object and the determined illumination effect.

19. The device according to claim 18, characterized in that the device further comprises:

an edition operation performing module configured to perform an edition operation for the target game scene after the reconstruction of the target game scene is completed; and a scene data updating module configured to update scene data of the target game scene according to the edition operation, wherein, the scene data at least comprises: the identifier of the scene template of the target game scene, the identifier of the scene object in the target game scene and the location information of the scene object in the target game scene.

20. The device according to claim 18, characterized in that the device further comprises:

a storage space detecting module configured to detect whether current remaining storage space is larger than a preset threshold; and a second data storage module configured to store all data of the target game scene after the reconstruction in the case that the detection result from the storage space detecting module is true.

* * * * *